(12) United States Patent
Hill (10) Patent No.: US 6,990,569 B2
(45) Date of Patent: Jan. 24, 2006

(54) HANDLING PROBLEMATIC EVENTS IN A DATA PROCESSING APPARATUS

(75) Inventor: Stephen John Hill, Austin, TX (US)

(73) Assignee: Arm Limited, Cambridge (GB)

( * ) Notice: Subject to any disclaimer, the term of this patent is extended or adjusted under 35 U.S.C. 154(b) by 585 days.

(21) Appl. No.: 09/983,779

(22) Filed: Oct. 25, 2001

(65) Prior Publication Data

US 2003/0084272 A1    May 1, 2003

(51) Int. Cl.
*G06F 9/00* (2006.01)

(52) U.S. Cl. ..................... 712/227; 712/208

(58) Field of Classification Search ............... 712/227, 712/208, 209, 23, 24; 714/39, 35, 25

See application file for complete search history.

(56) References Cited

U.S. PATENT DOCUMENTS

| | | | | |
|---|---|---|---|---|
| 5,794,063 A | * | 8/1998 | Favor ..................... | 712/23 |
| 5,941,995 A | * | 8/1999 | Morrison ................. | 714/39 |
| 6,134,676 A | * | 10/2000 | VanHuben et al. ....... | 714/39 |
| 6,553,513 B1 | * | 4/2003 | Swoboda et al. ......... | 714/28 |
| 6,754,852 B2 | * | 6/2004 | Swoboda .................. | 714/39 |
| 2002/0184477 A1 | * | 12/2002 | Swaine et al. ............ | 712/227 |

* cited by examiner

*Primary Examiner*—Henry W. H. Tsai
(74) *Attorney, Agent, or Firm*—Nixon & Vanderhye P.C.

(57) ABSTRACT

A data processing apparatus is provided comprising: a processor operable to execute instructions, each instruction having a micro-architectural state information associated therewith; comparator logic operable to compare the micro-architectural state information with predetermined micro-architectural state information associated with a problematic event and to issue a match signal if a match is detected; and trigger logic responsive to the match signal to provide one of a plurality of output signals, the trigger logic being programmable to determine which of the output signals is provided upon receipt of the match signal, each output signal being arranged to activate a corresponding mechanism to handle the problematic event. This advantageous arrangement alleviates problems encountered by prior art approaches by providing a programmable mechanism to identify a problematic event and to activate an appropriate mechanism to handle that problematic event. Hence, even after the hardware design of the processor has been finalised, problematic events can be identified and a mechanism activated to handle those problematic events once detected by the data processing apparatus, without requiring the faulty hardware to be modified, or the body of the software to be rewritten.

20 Claims, 5 Drawing Sheets

HANDLING PROBLEMATIC EVENTS IN A DATA PROCESSING APPARATUS

BACKGROUND OF THE INVENTION

1. Field of the Invention

The present invention relates to the handling of problematic events in a data processing apparatus.

2. Description of the Prior Art

A typical data processing apparatus may have a processor core arranged to execute a sequence of instructions that are applied to data values supplied to the processor core. Typically, a memory may be provided for storing the instructions and data values required by the processor core. Further, it is often the case that one or more caches are provided for storing instructions and data values required by the processor core, so as to reduce the number of accesses required to the memory.

Some events can cause the processor core to operate incorrectly or in an unintended manner, such events being referred to herein as "problematic events". These problematic events may, for example, arise from a problematic instruction. These problematic instructions are particular instances of instructions that, often in combination with other instructions or other micro-architectural state, cause the processor core to operate in an unintended manner. One reason for the processor core operating incorrectly or in an unintended manner is that the processor core may be found to have faults due to, for example, design errors in the hardware. These faults (also known as 'bugs') can lead to the processor core to respond to instructions in an unintended manner. This can lead to erroneous results being obtained. In some circumstances the problematic instructions result in sub-optimal performance being achieved by the processor core, and exceptionally the processor core will cease to operate and will require re-initialisation.

In instances where the faults can be identified before the hardware design of the processor core has been finalised, the design of the processor hardware can be adapted to rectify the faults. However, once the physical design of the processor core has been finalised, rectifying the fault is more complicated.

In Complex Instruction Set Computers (CISC) processors, so-called 'microcode' is provided which details a sequence of microcode operations to be performed to execute each complex instruction received by the processor. Typically, a Read Only Memory (ROM) embedded in the processor is provided which stores the sequences of microcode operations that have to be run to execute each complex instruction. When an instruction is fetched from a memory and passed to a decode stage of the processor, the ROM will be interrogated to determine the sequence of microcode operations which correspond to the complex instruction. The sequence of microcode operations is then executed. When the sequence of microcode operations is complete, the processor decodes the next instruction.

If faults are detected after the hardware design of the CISC processor has been finalised, it is possible that execution of one or more of the complex instructions could be problematic, resulting in the processor operating incorrectly or in an unintended manner. One way to overcome this problem is to use Random Access Memory (RAM) rather than ROM to store the sequences of microcode operations to be performed to execute each complex instruction. A mechanism is then provided to initialise the contents of the RAM. By this approach, it is possible to change the sequence of microcode operations to be performed to execute such a problematic complex instruction so as to provide corrective action in software for the hardware fault. In particular, when the problematic complex instruction is to be executed, the amended sequence of microcode operations will be executed, thereby automatically taking corrective action to compensate for the identified fault in the hardware.

As an alternative to the above approach, some CISC processors that use ROM to store the microcode sequences have provision for a so-called "ROM patch" to be used. In such CISC processors, a programmable mechanism is provided that enables a limited number of entries in the ROM to be overridden, thereby enabling a certain amount of amendment to the microcode sequences used to execute each complex instruction.

However, whilst the above techniques are useful in processor architectures where microcode is utilised, there are many processor architectures that do not use microcode, and hence in which the above techniques are not usable. One example is the so-call Reduced Instruction Set Computer (RISC) architecture. RISC processors implement simple instructions and do not require microcode. Rather than microcode, a hard-wired instruction decode of the simple instructions is performed, such that the instructions are directly implemented in logic. Accordingly, if there is a fault in the hardware, then it is more difficult to handle problematic instructions that can give rise to incorrect operation of the processor core or which can cause the processor core to respond in an unintended manner.

In RISC processors, it is sometimes possible to circumvent such faults through software workarounds, by in effect rewriting the relevant parts of the software to be executed on the processor core. However, this is very undesirable as it requires recompiling all of the support code, libraries, etc. Further, the worst case scenarios for every potentially problematic instruction have to be assumed, and this will often lead to a large increase in code size. This is a significant overhead.

Accordingly, it is desired to provide an improved technique for handling problematic instructions, particularly, but not exclusively, in the RISC processor environment.

SUMMARY OF THE INVENTION

Viewed from a first aspect, the present invention provides a data processing apparatus comprising: a processor operable to execute instructions, each instruction having micro-architectural state information associated therewith; comparator logic operable to compare the micro-architectural state information with predetermined micro-architectural state information associated with a problematic event and to issue a match signal if a match is detected; and trigger logic responsive to the match signal to provide one of a plurality of output signals, the trigger logic being programmable to determine which of the output signals is provided upon receipt of the match signal, each output signal being arranged to activate a corresponding mechanism to handle the problematic event.

The data processing apparatus of the present invention alleviates problems encountered by prior art approaches by providing a programmable mechanism to identify a problematic event and to activate an appropriate mechanism to handle that problematic event. The provision of programmable logic for detecting problematic events and activating a corresponding mechanism to handle that event significantly improves flexibility and ease of use over the corrective software approach of the prior art, since it avoids the need to rewrite portions of the operating system and application software. There is hence no requirement for recompiling all of the support code, libraries, etc when utilising the present invention, thereby reducing the inconvenience, distribution and version control problems associated with the corrective software approach of the prior art.

The programmable nature of the trigger logic provides the advantages of the ROM patch but in a non-microcode environment. Furthermore, there is increased flexibility over the ROM patch approach since it will be appreciated that the number of problematic events that can be dealt with using a ROM patch is likely to be very limited.

Typically, data to program the comparator logic, the trigger logic and the mechanisms for handling problematic events will be loaded from memory when the data processing apparatus is first initialised. Alternatively, the data can be provided via an external mechanism. Hence, even after the hardware design of the processor core has been finalised, problematic events can be identified and a mechanism activated to handle those problematic events once detected by the data processing apparatus, without requiring the faulty hardware to be modified, or the body of the software to be rewritten.

In the present invention, the trigger logic is operable to provide an appropriate output signal to activate one of a plurality of mechanisms operable to handle the problematic events. Hence, a number of different mechanisms can be provided which can deal with the problematic events. It will be appreciated that this ability to provide different mechanisms increases flexibility when handling problematic events.

The processor has micro-architectural state information associated therewith. Architectural state information is a subset of the micro-architectural state information and is explicitly visible to a programmer. Often it is possible for a programmer to infer the value of micro-architectural state information not included in the architectural state information from the operation of the program being executed by the processor. Typically, some micro-architectural state information is associated with each instruction the processor is executing. Some micro-architectural state information provides information to the different elements of the data processing apparatus relating to the nature of the instruction. Such micro-architectural state information will typically already be available within existing data processing apparatuses. The use of micro-architectural state information to detect problematic events enables advantage to be taken of existing signals and data flowing in the data processing apparatus.

The comparator logic is operable, upon detection of predetermined micro-architectural information associated with a problematic event, to issue a match signal. It will be appreciated that this match signal may be in any suitable form, one such form being the setting or clearing of a particular data line. Typically, a match may be represented by setting a data line to a binary '1', whilst the absence of a match may be represented by clearing a data line to a binary '0', or vice-versa.

The trigger logic, in response to the match signal being set, determines which mechanism to activate to handle the problematic event. Any suitable mechanisms may be provided. The trigger logic is typically programmed to activate one of the mechanisms most suited to handling that problematic event.

In preferred embodiments, the comparator logic comprises a plurality of comparators, each comparator having predetermined micro-architectural information associated therewith, the trigger logic being arranged to receive the match signals from each comparator and being programmable to output one of the plurality of output signals in dependence on the match signals.

Owing to the provision of a plurality of comparators, each of which can be implemented readily to form the comparator logic, a plurality of predetermined micro-architectural information, each corresponding to a problematic event, may be detected. The ability to detect different problematic events provides increased flexibility.

In preferred embodiments, the problematic event is an instance of a problematic instruction.

In such an embodiment, the trigger logic will determine, upon issuance of a match signal, a suitable mechanism to activate to handle the problematic instruction. For example, the trigger logic may activate a mechanism to isolate the problematic instruction from other instructions being executed, so as to allow predictable execution, or alternatively a mechanism may be provided to trigger an exception routine to deal with the problematic instruction. The problematic instructions may be detected singly or in any combination or sequence as required.

It will be appreciated that it is often the case that single occurrences of an instruction may not be problematic, but instead the occurrence of one instruction in combination with another, for example, a read instruction to a status register immediately after a write instruction to that status register, may be problematic.

In an embodiment of the present invention, the processor has a plurality of pipelined stages, each comparator being provided at one of the pipelined stages to enable a sequence of problematic instructions to be detected.

A comparator may be provided at a predetermined number of the pipelined stages, whilst in preferred embodiments a comparator is provided at each of the pipelined stages. The provision of a comparator at a plurality of the pipelined stages takes advantage of the pipelined architecture and advantageously enables a sequence of problematic instructions to be identified. Hence, in such embodiments, only when a predetermined sequence or combination of problematic instructions occurs will a mechanism to handle that sequence or combination of instructions be activated. The combination or sequence need not require consecutive instructions to be identified. It will be appreciated that the comparator and trigger logic may be arranged to identify a first problematic instruction, then either identify or ignore one or more further instructions, followed by one or more further problematic instructions either alone or in combination. It will be appreciated that this approach significantly improves performance by reducing the need to activate the mechanisms for handling problematic instructions unnecessarily.

According to an embodiment the processor has a plurality of pipelined stages, the plurality of comparators being provided at one of the pipelined stages to enable a plurality of problematic instructions to be detected at the one of the pipelined stages.

This arrangement enables the identification of any of a number of problematic instructions at the particular pipelined stage, or with appropriate latching could be used to detect sequences of instructions occurring at that stage.

This arrangement is also well suited to use in so-called super-scalar architectures where, for example, multiple instructions are decoded at a decode stage in the pipeline and then flow through subsequent stages in parallel. Hence, each comparator can detect whether any of the parallel multiple instructions is a problematic instruction.

It will be appreciated that either the arrangement where the comparators are located at one of the pipelined stages, or the arrangement where the comparators are placed at a number of pipelined stages, or a combination of the two where more than one comparator is placed at more than one pipelined stage may be selected to suit a particular data processing apparatus and/or its architecture.

A typical further inefficiency of prior art approaches is that some instructions are only problematic when the data processing apparatus or its elements are operating in a particular mode or micro-architectural state.

In embodiments of the present invention, the data processing apparatus has other micro-architectural state information associated therewith and the plurality of comparators includes at least one comparator having predetermined other micro-architectural state information associated therewith to enable a plurality of problematic instructions to be detected in combination with the predetermined other micro-architectural state information.

Hence, in preferred embodiments the occurrence of particular potentially problematic instructions are qualified by determining the status of the data processing apparatus, or one or more of its components. This other micro-architectural state information need not relate to or be associated with particular instructions flowing through the processor. Instead, this other micro-architectural state information provides general information relating to the general operation of the processor or information relating to the current operating mode of the processor. Typical examples of other micro-architectural state information include control signals or data indicating: whether branch prediction is on or off; whether the processor is in user or supervisor mode; whether interrupts are on or off; the status of flags; that there is a branch in the decode stage of the pipeline; that there is a coprocessor instruction somewhere in the pipeline or that a coprocessor has just signalled that it needs another cycle to finish an instruction, etc. This approach ensures that a mechanism to handle the problematic instruction is only activated if the micro-architectural state of the data processing apparatus is such that the instruction is likely to cause the apparatus to operate incorrectly or to cause the data processing apparatus to respond in an unintended manner.

It will be appreciated that each pipeline stage in a pipelined processor can contain an instruction at a different stage of completion. In a super-scalar processor some pipelined stages can hold several incomplete instructions. Thus, in a microprocessor there can be many instructions in the system that are at many different stages of completion. There can be complex interactions between these instructions which can cause the processor to operate incorrectly. As an example, a problematic event can arise when two instructions require the same hardware resources in order to progress toward completion. Another example is when an incomplete instruction has a destination operand that forms the source operand of a closely following incomplete instruction. Handling such problematic events presents difficulties.

In one embodiment, the processor has a plurality of pipelined stages, said problematic event is an instance of a problematic instruction and the trigger logic is programmed to issue a first output signal responsive to the match signal to activate a mechanism to serialise the problematic instruction.

Hence, embodiments of the present invention can avoid these complex interactions of problematic instructions by allowing any identified problematic instruction to be serialised.

An instruction can be serialised over all or part of the pipeline. Typically, when an instruction to be serialised is detected, the mechanism will prevent the instruction from being progressed until all other incomplete instructions ahead of it in the pipeline are complete. Only once there are no more incomplete instructions in the part of the pipeline concerned will the mechanism allow the serialised instruction to proceed. In some cases further instruction issues will then be held up by the mechanism until the serialised instruction has completed. In other cases, once the serialised instruction has issued, instructions following the serialised instruction will be allowed to issue.

It will be appreciated that fully serialising instructions may reduce a processor's throughput significantly. Hence, a single empty instruction slot may be inserted before or after an instruction, this being known as a bubble. It has been found that the bubble is often enough to fix a problem and, advantageously, impacts less on processor performance.

Hence, serialising alleviates the problems associated with a large class of these instructions which have complex interactions and which may be in the pipeline together. However, serialising may not provide a solution to all problematic events.

Hence, in embodiments of the present invention, wherein said problematic event is an instance of a problematic instruction, the trigger logic may be programmed to issue a second output signal responsive to the match signal to activate a mechanism to trap the problematic instruction.

In situations where serialising is insufficient to alleviate the effects of the problematic instruction, a trap mechanism may be activated. The trap mechanism is activated by the second output signal from the trigger logic. The trigger logic outputs the second output signal in response to match signals from the comparator logic following the detection of one or more problematic instructions. The trap mechanism typically invokes a software handler to either alter the problematic instruction or its associated data prior to execution by the processor, or to run predetermined code to execute the instruction without any faults, without the manifestation of any undesirable effects, or without causing the processor to operate in an unintended manner prior to returning control to the processor.

Typically, it is not necessary to provide a mechanism to correct the bug directly, but rather the software handler can provide a 'work around' or can wait for the circumstances which cause the problematic effect to manifest to disappear. In some circumstances the act of entering the software handler will be enough to work around the problematic condition.

It will be appreciated that the selection of the trap mechanism or the serialise mechanism is not mutually exclusive. There are situations where the effects of a problematic instruction may be corrected by serialising, but a trap mechanism is activated instead. However, given that the trap mechanism typically involves branching to and executing the trap handler software in memory, it will be appreciated that, for performance reasons, it is usually more desirable to serialise the problematic instruction where possible.

In preferred embodiments, the micro-architectural state information is an instruction type indication.

It will be appreciated that the instruction type indication may be the raw instruction itself or some decoded or generated portion therefrom. The instruction type indications preferably provide information to the different elements of the data processing apparatus relating to the nature of the instruction. Such instruction type indications are typically already available within existing data processing apparatuses. The use of an instruction type indication obtained by decoding the raw instruction enables advantage to be taken of existing signals and data flowing in the data processing apparatus and removes the need to propagate the full instruction through the data processing apparatus. For example, it will be appreciated that a full instruction may typically comprise 32-bits, whereas a decoded instruction type indication may comprise only 8-bits. It is clearly advantageous to utilise the 8-bit instruction type where possible instead of having to propagate the full 32-bit instruction which may require increased size busses or require the instruction to be packaged in a particular manner.

In preferred embodiments the comparator logic includes mask logic operable to identify a logical range of predetermined instruction types.

The mask logic can be used to enable the comparator logic to identify a wide number of instruction types and reduces the need for a correspondingly large amount of logic. Hence, in embodiments where the comparator logic comprises a plurality of comparators, each comparator can identify a plurality of instruction types. This reduces the need to have one comparator dedicated to identifying each problematic instruction.

This approach is particularly advantageous where it is determined that sets of instructions, for example LOAD, BRANCH, etc. instructions, are problematic and the instruction type for these sets of instructions have a predetermined format, for example the instruction type for LOAD instructions is preferably a 8-bit binary number of the form 8'b1100_0xxx, where x is a 'don't care condition'. Hence, by incorporating mask logic, it is possible for a single comparator to determine all occurrences of the problematic LOAD instructions.

Viewed from a second aspect, the present invention provides a data processing apparatus comprising: a processor operable to execute instructions, each instruction having an instruction type indication associated therewith; comparator logic operable to compare the instruction type indication with a predetermined instruction type associated with a problematic instruction and to issue a match signal if a match is detected; and trigger logic responsive to the match signal to provide one of a plurality of output signals, the trigger logic being programmable to determine which of the output signals is provided upon receipt of the match signal, each output signal being arranged to activate a corresponding mechanism to handle the problematic instruction.

Viewed from a third aspect, the present invention provides a problematic event detector for a data processing apparatus having a processor operable to execute instructions, each instruction having micro-architectural state information associated therewith, the problematic instruction detector comprising: comparator logic operable to compare the micro-architectural state information with predetermined micro-architectural state information associated with a problematic event and to issue a match signal if a match is detected; and trigger logic responsive to the match signal to provide one of a plurality of output signals, the trigger logic being programmable to determine which of the output signals is provided upon receipt of the match signal, each output signal being arranged to activate a corresponding mechanism to handle the problematic event.

Viewed from a fourth aspect, the present invention provides a method of handling problematic events in a data processing apparatus having a processor operable to execute instructions, each instruction having micro-architectural state information associated therewith, the method comprising the steps of: a) comparing the micro-architectural state information with predetermined micro-architectural state information associated with a problematic event; b) issuing a match signal if a match is detected during the comparing step; and c) responsive to the match signal, causing trigger logic to provide one of a plurality of output signals, each output signal being arranged to activate a corresponding mechanism to handle the problematic event, and the trigger logic being programmable to determine which of the output signals is provided upon receipt of the match signal.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
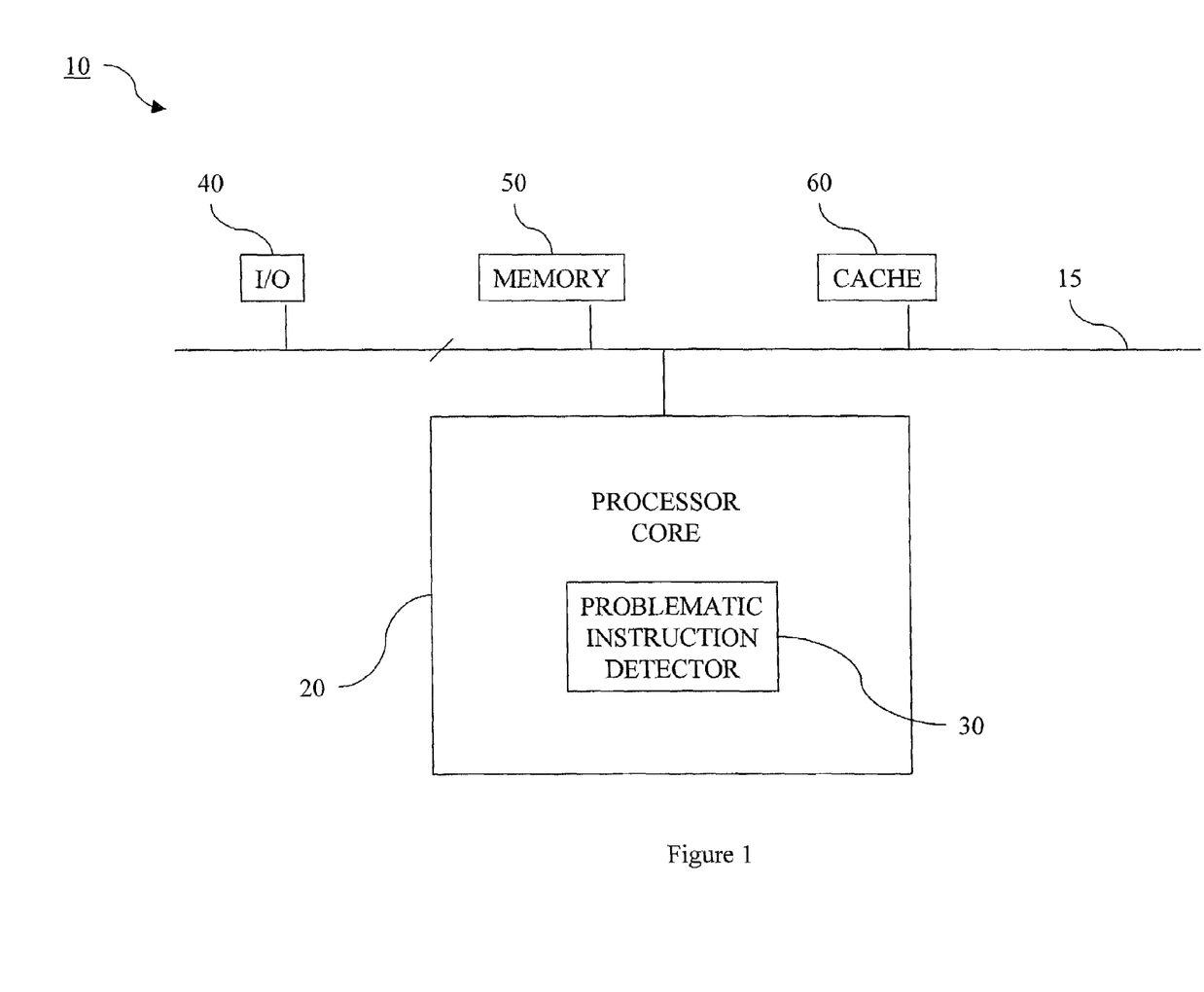
FIG. 1 is a schematic diagram illustrating a data processing apparatus according to an embodiment of the present invention.

FIG. 1 is a schematic diagram illustrating a data processing apparatus according to an embodiment of the present invention.

The data processing apparatus, generally 10, has a processor core 20 arranged to execute a sequence of instructions that are applied to data supplied to the processor core 20 over a bus 15. Hereinafter, the term data value will be used to refer to either instructions or data. A memory 50 may be provided for storing the data values required by the processor core 20. A cache 60 may also be provided for storing data values required by the processor core 20, this increasing the speed of processing since the number of accesses required to the memory 50 over the bus 15 is reduced. Data values may also be received from and provided to external devices using input/output logic 40 via the bus 15.

The processor core 20 receives typically 32-bit data values from either the memory 50, the cache 60 or another device. The processor core 20 generates micro-architectural state which preferably includes all the values stored and all the signals communicated by the processor core 20. A decoder (not shown) decodes the 32-bit instructions and generates, amongst other items, micro-architectural state which includes an instruction type, in the form, for example, of an 8-bit instruction class. The instruction type provides the processor core 20 with information regarding how the processor core 20 should handle the instruction.

The problematic instruction detector 30 receives each instruction type and compares the received instruction type with predetermined instruction types stored therein. The predetermined instruction types correspond to instances of instructions which are known to be problematic or which result in a problematic event. These problematic instructions are determined during testing and debugging of the processor core 20 and are known to result in faulty or undesirable operation of the processor core 20 or data processing apparatus 10, or to cause the processor core 20 or the data processing apparatus 10 to operate in an unintended manner.

The predetermined instruction types and any other required micro-architectural state are loaded into storage (not shown) provided within problematic instruction detector 30. The storage can be non-volatile, or alternatively the storage can be volatile and therefore the predetermined instruction types and any other required micro-architectural state would need to be loaded each time the data processing apparatus 10 is initialised. In this example, the predetermined instruction types and any other required micro-architectural state are loaded from memory 50 each time the data processing apparatus 10 is initialised. Alternatively, the predetermined instruction types and any other required micro-architectural state are loaded via the input/output logic 40.

When the problematic instruction detector 30 identifies a received instruction type which corresponds to a predetermined instruction type then a mechanism (not shown) is activated to handle the problematic instruction. Many mechanisms may be provided. The mechanism may operate in hardware or be a portion of software code. The mechanism alleviates the effects of the problematic instruction without requiring the hardware to be modified or redesigned, or the body of software to be rewritten.

Figure 2:
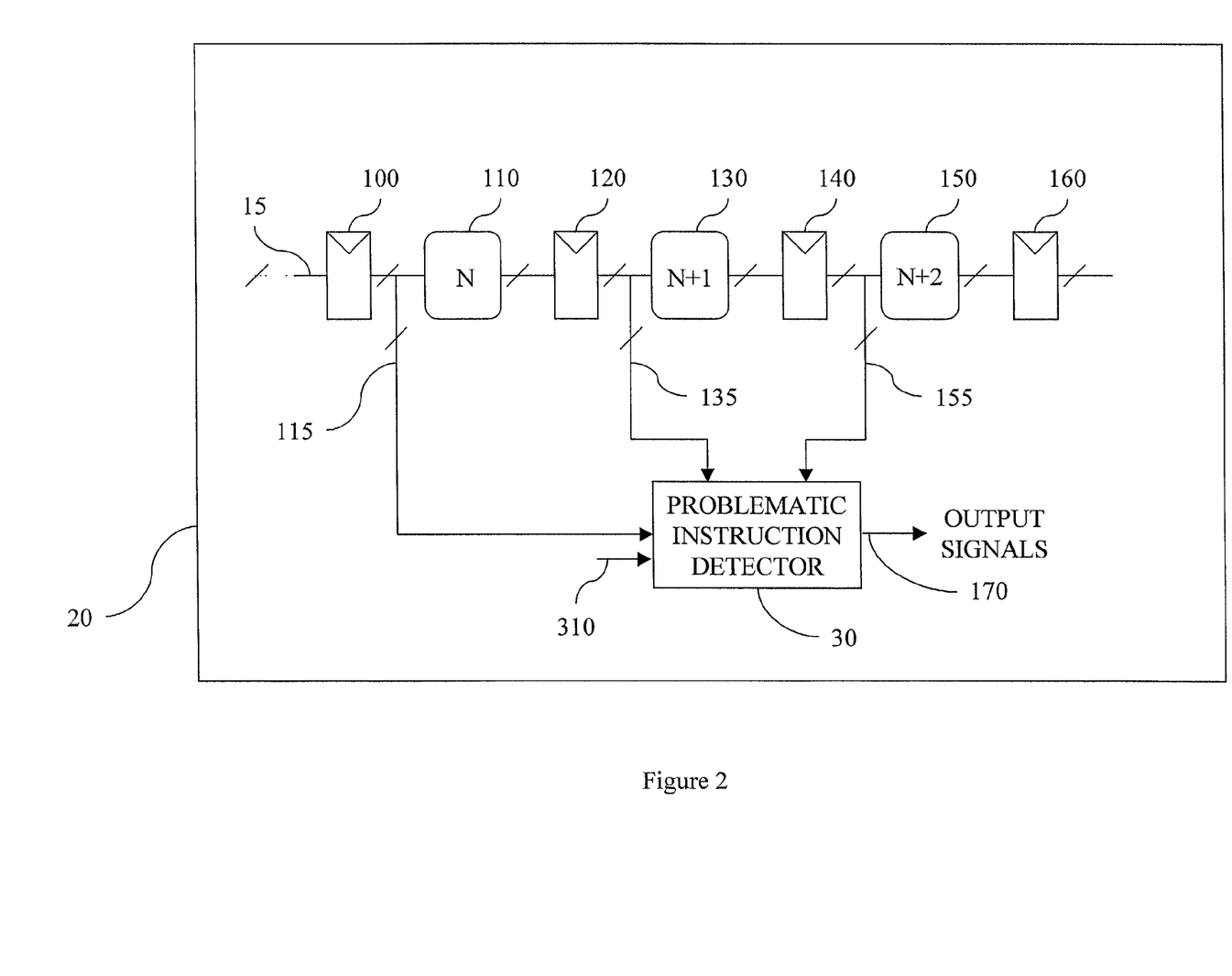
FIG. 2 is a schematic diagram illustrating a pipelined processor including a problematic instruction detector according to an embodiment of the present invention.

FIG. 2 is a schematic diagram illustrating a pipelined processor including a problematic instruction detector 30 according to an embodiment of the present invention.

In this embodiment, the processor 20 is a pipelined processor having multiple stages, three of which are shown in FIG. 2. As will be appreciated by those skilled in the art, where instructions take multiple clock cycles to complete, pipelined processors provide speed advantages by enabling more than one instruction to be processed simultaneously. Instructions are received by the processor 20 either from memory 50 or from the cache 60 over the bus 15 and clocked into the pipeline. Typically, the instruction proceeds through each consecutive stage of the pipeline on each clock cycle.

A section of the pipeline is shown in FIG. 2. The section of the pipeline illustrated has three stages, stage N, stage N+1, and stage N+2. As an example, stage N may correspond to a decode stage 110, stage N+1 may correspond to an execute stage 130 and stage N+2 may correspond to a memory stage 150. However, it will be appreciated that the stages could correspond to other stages such as, for example, fetch, execute 1, execute 2 etc. Also, it will be appreciated that the pipeline may have more or less stages, as required.

Explanation will now be given of the progress of one instruction through the pipelined stages of the preferred embodiment. An instruction is received on the bus 15 and stored in the register 100. On the rising edge of a clock, the contents of the register 1100 are passed to the decode stage 110, where the instruction is decoded and stored in the register 120. On the next rising edge of the clock, the contents of the register 120 are passed to the execute stage 130 and the results passed to the register 140. On the next rising edge of the clock, the contents of the register 140 are passed to the memory stage 150 and the result stored in the register 160. This technique will be familiar to those skilled in the art.

At each stage micro-architectural state information associated with the instruction such as, for example, the instruction type indication of the instruction at that stage of the pipeline, will be provided to the problematic instruction detector 30 over the buses 115, 135 and 155 in order that it may determine whether any of those instructions match a predetermined instruction which corresponds with a problematic instruction type. Other information relating to the micro-architectural state of the processor core 20 is provided to the problematic instruction detector 30 over the bus 310. The buses 15, 115, 135 and 155 are of a size suitable to carry the instructions. Should a problematic instruction or event be encountered then an output signal 170 will be provided to activate a mechanism to handle the problematic instruction or event.

Although it has been shown that the problematic instruction detector 30 receives an input from every stage, it will be appreciated that this need not be the case. Instead, given that the instructions generally pass through every stage of the pipeline the problematic instruction detector 30 could receive instruction type indications from just one of the stages. However, by receiving instruction type indications from different stages of the pipeline it is possible for the problematic instruction detector 30 to readily identify predetermined sequences or combinations of instructions which may be problematic. Although it would be possible to detect such combinations or sequences by receiving instructions from just one stage, this would generally require the problematic instruction detector 30 to retain some state regarding previous instructions that passed through that stage.

However, by receiving instructions for multiple stages no such state is required. If combinations or sequences of two instructions are required to be detected then instructions only need to be received from two stages. More generally, if sequences or combinations of "M" instructions need to be detected then the instructions would typically be received from "M" stages. Also, it will be appreciated that instructions need not be received from consecutive stages but may be received from every other or any combination of stages.

The flow of an example sequence of problematic instructions through the pipeline will now be described. In this example, the processor 20 has 6 pipelined stages, namely, Fetch—Issue—Decode—Execute—Memory—Write. The fetch and issue stages are not shown in FIG. 2 but would occur prior to the decode stage 110. The write stage is also not shown in FIG. 2 but would occur following the memory stage 150.

Consider this program, comprising the following two instructions, where R1 to R5 are registers in a register bank.
1) ADD R3, R1, R2; //R3<=R1+R2 (i.e. add the contents of R1 to the contents of R2 and store the result in R3)
2) ADD R5, R3, R4; //R5<=R3+R4 (i.e. add the contents of R3 to the contents of R4 and store the result in R5)

At a point during execution the pipeline might look like this:

| (N − 2) | N − 1 | N | N + 1 | N + 2 | N + 3) |
|---------|-------|--------|-----------|----------|-------|
| Fetch | Issue | Decode | Execute 2 | Memory 1 | Write |

This sequence of instructions shows a data dependency. Instruction 2 needs the result of instruction 1 (R3) in order to execute. Normally, instruction 2 will get this value from the register R3. However, the data value for register R3 is not written until the write stage, and instruction 1 has not yet reached that stage.

In these circumstances it is usual for a forwarding path to be provided to pass the data value for register R3 to instruction 2. However, if there is an error in the hardware design and the forwarding path was not selected for data dependent adds, then instruction 2 would get the wrong data value for register R3.

However, using the arrangement illustrated in FIG. 2, it is possible to detect data dependent adds at an early stage in the pipeline. For example, instruction 1 can be detected at the execute stage 130, and instruction 2 at the decode stage 110. Equally, it will be appreciated that it would have been possible to detect these instructions earlier in the pipeline, for example at the fetch or issue stages (not shown). Upon detection of this sequence of instructions it is possible to delay instruction 2 for one or more cycles such that instruction 1 writes its result to the register R3 before that register is read by instruction 2, and the forwarding path does not need to be used.

The operation of the problematic instruction detector 30 will now be described in more detail by using two further examples. In example 1, instruction A is problematic and needs to be serialised. In example 2, the sequence of instructions B, C, D is problematic and needs to be trapped.

For example 1, the problematic instruction detector 30 is configured such that when instruction A is detected at either stage N, N+1 or N+2 then an output signal occurs to activate a mechanism to serialise the instruction.

For example 2, the problematic instruction detector 30 is configured such that when instruction B is detected at stage N+2, instruction C is detected at stage N+1 and instruction D is detected at stage N then an output signal occurs to activate a mechanism to trap the problematic instruction sequence.

It will be appreciated that the problematic instruction detector 30 may be configured to detect one or more problematic instructions constituting a problematic event. A plurality of problematic instructions in any sequence or combination may be detected and an appropriate mechanism or handler activated to alleviate the problematic effects of one or more of the instructions.

Figure 3:
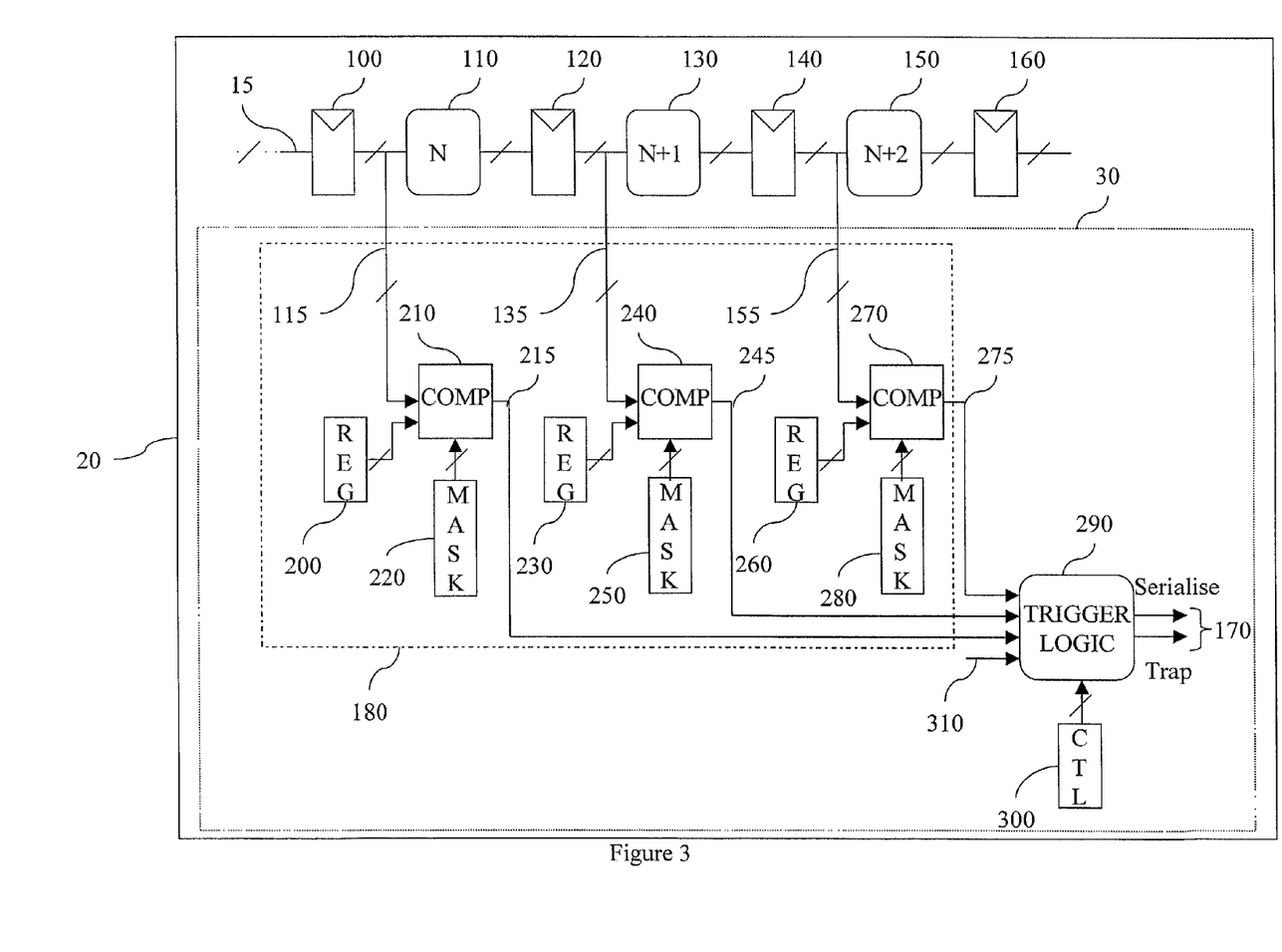
FIG. 3 is a schematic diagram illustrating in more detail the problematic instruction detector of FIG. 2.

FIG. 3 is a schematic diagram illustrating in more detail the problematic instruction detector 30 of an embodiment of the invention.

The problematic instruction detector 30 comprises comparator logic 180 and trigger logic 290. The comparator logic 180 receives instruction type indications from different stages of the pipeline. The comparator logic 180 comprises three comparators, namely, comparator 210, comparator 240 and comparator 270. Each comparator receives an instruction type indication from one of the stages. Comparator 210 receives instruction type indications from stage N, comparator 240 receives instruction type indications from stage N+1 and comparator 270 receives instruction type indications from stage N+2. Each comparator has an associated register 200, 230, 250 for storing predetermined instruction types. Each comparator also has an associated mask register 220, 250, 280, which is described in more detail below. Each comparator compares the instruction type indication received from its respective stage with the contents of its associated register. The content of the associated registers and the mask registers is programmable by any convenient mechanism. On detection of a predetermined instruction type, each comparator is operable to provide a respective match signal 215, 245, 275 to the trigger logic 290.

The trigger logic 290 receives match signals from the comparator logic 180. The trigger logic 290 also in preferred embodiments receives at least one signal over line 310, which is preferably a bus. The signals received over line 310 provide other information relating to the micro-architectural state of the processor 20 or the data processing apparatus 10 which will be described in more detail below. The operation of the trigger logic 290 is controlled by the control register 300, which is also described in more detail below. The trigger logic 290 is operable to provide one of a serialise and a trap signal in response to the match signals indicating detection of a problematic instruction or a sequence of problematic instructions.

The arrangement of the problematic instruction detector 30 for Example 1 will now be described. The instruction type associated with instruction A is loaded into one or all of registers 200, 230 and 260. Preferably, the instruction type is loaded into register 200 since this is the earliest in the pipeline and hence allows the problematic instruction to be detected as early as possible. In this preferred arrangement, the trigger logic 290 is arranged such that receipt of a match signal on line 215 will cause a serialise signal to be output. The serialise signal is arranged to activate a serialise mechanism.

Typically, the serialise mechanism will cause instruction A to stall at stage N until all instructions ahead have cleared the pipeline. Alternatively, if the use of a serialise bubble would be sufficient to overcome the problems associated with the problematic instruction, the serialise mechanism can be arranged to stall instruction A at stage N for one clock cycle and then to stall the subsequent instruction at stage N for one clock cycle.

The arrangement of the problematic instruction detector 30 for Example 2 will now be described. The instruction type associated with instruction B is loaded into register 260, the instruction type associated with instruction C is loaded into register 230 and the instruction type associated with instruction D is loaded into register 200. The trigger logic 290 is arranged such that receipt of a match signal within the same clock cycle on lines 215, 245 and 275 will cause a trap signal to be output. The trap signal is arranged to activate a trap mechanism.

Typically, the trap mechanism will activate a software routine to handle the problematic instructions. The thread of execution which included the problematic instruction(s) is halted whilst the software routine is executed by the pipeline. The software routine is arranged either to simulate the problematic instruction operating in the intended way entirely in software, or to take corrective action (such as to manipulate operands or manipulate the state of the processor) to enable the problematic instruction to operate in this manipulated environment in the intended manner. Once the software routine has been executed, the thread of execution which included the problematic instructions(s) is resumed.

The micro-architectural information provided over line 310 may be used by the trigger logic 290 to qualify the existence of a match with a predetermined instruction type. Using example 1, where it is known that instruction A is only problematic in a user mode, upon receipt of a match signal from the comparator logic 180, the trigger logic 290 will determine, based on micro-architectural state information provided over line 310 whether the data processing apparatus is in the user mode. If the information indicates the existence of the user mode then an output signal will be provided to activate a serialise mechanism. If the information indicates the existence of a different mode then no output signal will be provided. Examples of micro-architectural information include user/supervisor mode and branch prediction on/off.

Although the arrangement in FIG. 3 shows one comparator for each of the stages, it will be appreciated that more than one comparator could be provided at each stage with their respective match signals being received by the trigger logic 290. This arrangement would allow more than one condition to be identified. This arrangement would also be suited to a super-scalar architecture.

Figure 4:
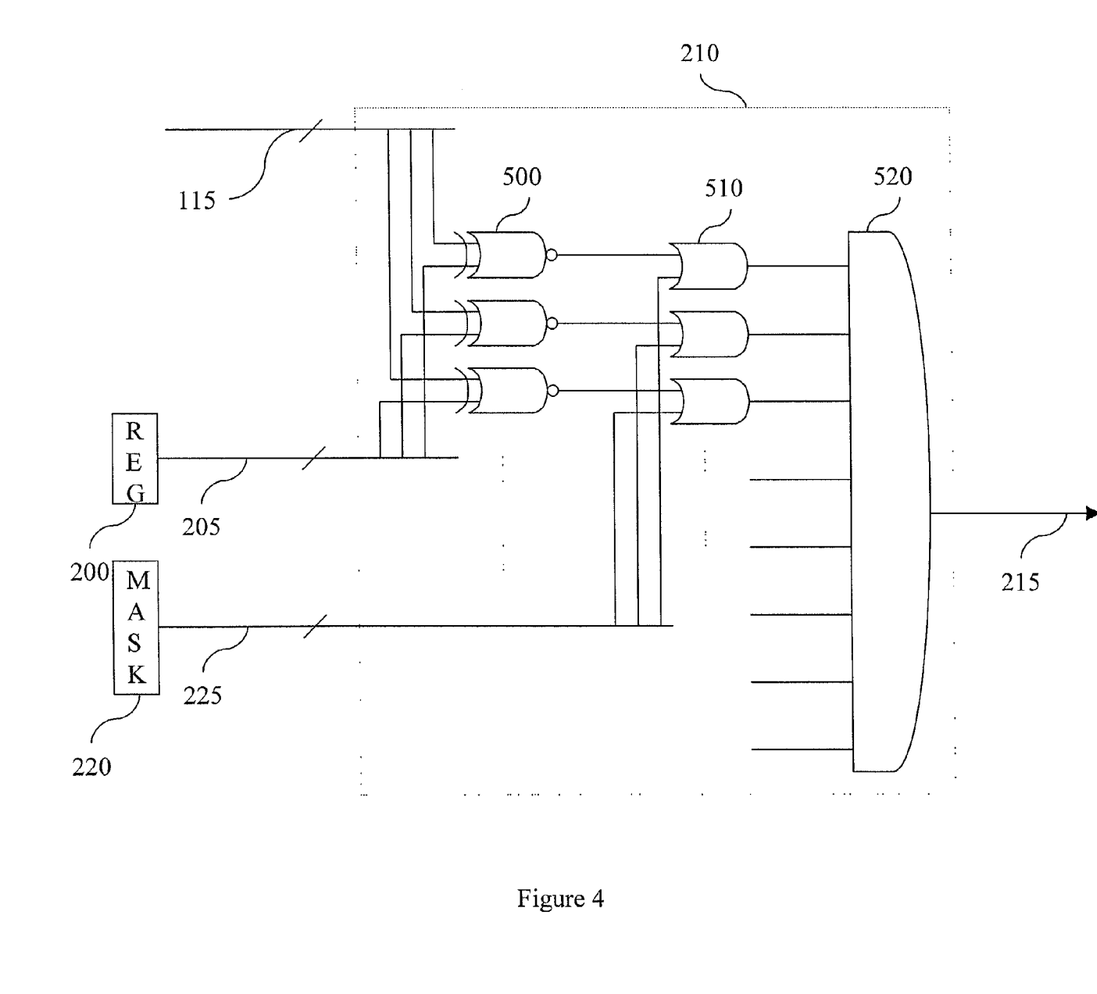
FIG. 4 is a schematic diagram illustrating the configuration of the comparator logic of FIG. 3.

FIG. 4 is a schematic diagram illustrating the configuration of the comparator logic 210. The configuration described with respect to comparator logic 210 is repeated for comparator logic 240 and 270.

The comparator logic 210 is operable to identify a plurality of instruction types by utilising a register 220, which contains mask information. The mask register may be arranged such that a match signal is obtained irrespective of the logical state of predetermined bits of the instruction type. This enables a logical range of predetermined instruction types to be identified by each comparator logic 210.

The comparator logic 210 receives signals from stage N over bus 115, register 200 over bus 205 and register 220 over bus 225. The signal provided over bus 115 represents the instruction type of the instruction at stage N of the pipeline. The signal provided over bus 205 represents a predetermined instruction type stored in the register 200. The signal provided over bus 225 represents a mask condition stored in the register 200. The signals from the buses are split into single bit lines. In this example each bus 115, 205 and 225 carries 8-bits and hence the bus is split into 8 bit lines. Each bit line is provided to a respective combinational logic circuit composed of a XNOR gate 500 and an OR gate 510. For clarity only three such combinational logic circuits are shown, but these are repeated for the remaining bit lines. The output of each combinational logic circuit is provided to an AND gate 520. The AND gate 520 is arranged to provide a match signal on line 215. Whilst this embodiment relates to an 8-bit bus, it will be appreciated that this circuit can be arranged to accommodate any size bus.

Storing all logical '0's in the register 220 deactivates the mask. Hence, with the mask deactivated the comparator logic 210 will only issue a match signal should the instruction type provided over bus 115 exactly match the predetermined instruction type stored in register 200. However, a mask condition may be set by storing logical '1's in appropriate locations in the register 220. For example, should a particular class, range or set of instruction types having the value 8'b0000_10XX be problematic (where 8'b denotes an 8-bit binary number, 0 represents a logical '0', 1 represents a logical '1' and X represents a 'don't care' condition where the bit may be a logical '0' or a logical '1'), then 8'b_0000_0011 is stored in the register 220.

The operation of the comparator logic 210 will now be described.

The least significant bit (LSB) of the 8-bit instruction type indication received over bus 115 is provided to a first input of the XNOR gate 500. The LSB of the predetermined instruction type received over bus 205 is provided to a second input of the XNOR gate 500. In the event of a match, a logical '1' is provided to a first input of the OR gate 510, whilst should there be no match then a logical '0' is provided to the first input of the OR gate 510.

The second input of the OR gate 510 receives the LSB of the register 220. If the LSB of the register 220 is set to a logical '0' then a logical '1' will only be output if the XNOR gate 500 has identified a match. Conversely, if the LSB of the register 220 is set to a logical '1', then a logical '1' will always be output irrespective of whether the XNOR gate 500 has identified a match. The output of the OR gate 510 is provided to an input of the AND gate 520.

The configuration of the XNOR gate 500 and the OR gate 510 is repeated for each bit of the instruction type, with all outputs being received by a respective input on the AND gate 520. Hence, in instances where for every bit position that the mask bit is set to 0, the instruction type bit matches the predetermined instruction type bit, the AND gate 520 issues a match signal to the trigger logic 290 on the line 215.

Figure 5:
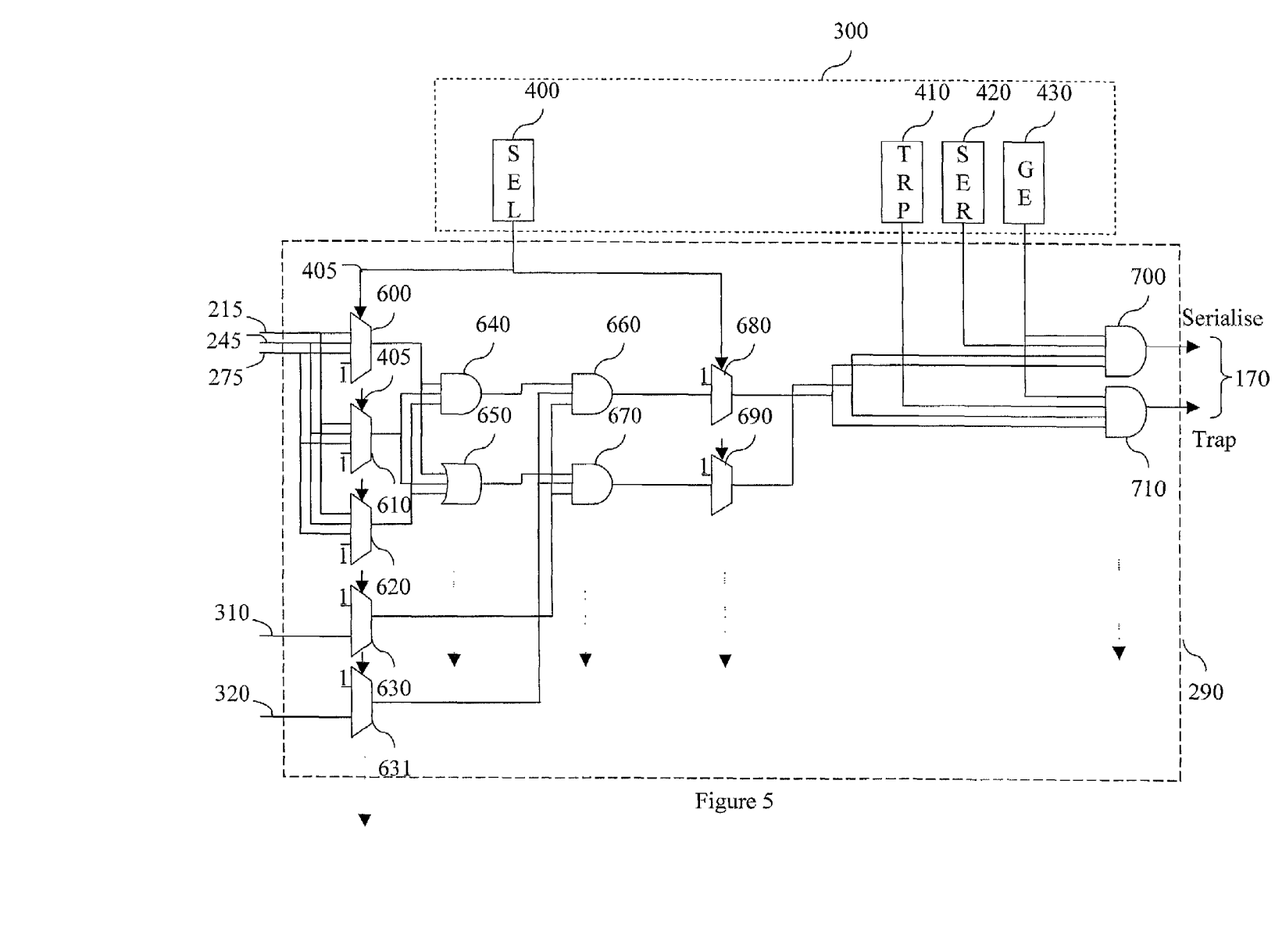
FIG. 5 is a schematic diagram illustrating in more detail trigger logic of FIG. 3.

FIG. 5 is a schematic diagram illustrating in more detail trigger logic 290.

The trigger logic 290 receives the match signals over lines 215, 245 and 275 and the micro-architectural state information signal over line 310. In this example, a further micro-architectural state information signal is shown being received over line 320. The trigger logic 290 is programmable using the control register logic 300 to provide an output signal in response to a predetermined combination of match signals and/or other micro-architectural state information signals. The output of the trigger logic 290 can be enabled or disabled by a global enable register 430 of the control register logic 300.

The control register logic 300 comprises a number of registers 400, 410, 420, 430. The select enable register 400, provides a signal over bus 405 to control the combination of match signals to be output by the multiplexers 600, 610 and 620 to the AND gate 640 and the OR gate 650. The multiplexers 600, 610 and 620 each receive the match signals 215, 245 and 275 at respective inputs, and in addition the multiplexers 600, 610 and 620 each receive a logical '1' at a further input. The AND gate 640 is provided to selectively enable predetermined combinations or sequences of match signals to be determined. The OR gate 650 is provided to selectively enable the occurrence of any one of a number of match signals to be determined. The output of the AND gate 640 is provided to an AND gate 660. The output of the OR gate 650 is provided to an AND gate 670.

The select enable register 400 also provides a signal over bus 405 to control whether the micro-architectural state information signal received at one of the inputs is to be output by the multiplexers 630 or 631. Micro-architectural state information signals are arranged typically to have a value of a logical '1' to indicate the presence of a micro-architectural state of interest, and a value of a logical '0' to indicate the absence of a micro-architectural state of interest. For example, if "branch prediction on state" as opposed to "branch prediction off state" is the micro-architectural state of interest, then should the processor be in the "branch prediction on state" then a logical '1' is typically provided over line 310, whereas should the processor be in the "branch prediction off state" then a logical '0' is typically provided over line 310. However, it will be appreciated that the micro-architectural state information signal could comprise more than one bit of data, in which case more than one multiplexer would be provided. Equally, more than one multiplexer could be provided for determining the presence of more than one micro-architectural state of interest.

If the micro-architectural state information signal is not to be output by the multiplexers 630 and 631 (i.e. the presence of a particular micro-architectural state will not be used to qualify the detection of a problematic instructions) then the multiplexers 630 and 631 are set to output a logical '1' which is provided at the other inputs to the multiplexers 630 and 631. The outputs of the multiplexers 630 and 631 are provided to inputs of both AND gate 660 and AND gate 670. Hence, the AND gate 660 selectively enables predetermined combinations or sequences of match signals which occur in conjunction with a predetermined micro-architectural state to be determined. The AND gate 670 is provided to selectively enable the occurrence of any one of a number of match signals in conjunction with a predetermined micro-architectural state to be determined. The output of AND gate 660 is provided to an input of multiplexer 680, and the output of AND gate 670 is provided to an input of multiplexer 690. The multiplexers 680 and 690 also receive a logical '1' at another input.

The select register 400 also provides a signal over bus 405 to control the output of the multiplexers 680 and 690. AND gate 700 receives an input from serialise enable register 420, whilst AND gate 710 receives an input from trap enable register 410. The output of the multiplexers 680 and 690 is provided to inputs of AND gate 700 and AND gate 710. Hence, the AND gate 700 or the AND gate 710 provide an output to selectively activate a mechanism dependent on to the outputs received from the multiplexers 680 and 690.

The operation of the control logic 300 and the trigger logic 290 will now be described with reference to Example 1.

As mentioned above, the trigger logic 290 is firstly programmed by the control logic 300. Accordingly, select register 400 in this instance is arranged to force multiplexer 600 to output the input received over line 215, to force multiplexer 610 to output the input received over line 245, to force multiplexer 620 to output the input received over line 275, to force multiplexers 630, 631 and 680 to output the logical '1' input, and to force multiplexer 690 to output the input received from AND gate 670. Trap enable register 410 is set to output a logical '0', whilst serialise enable register 420 is set to output a logical '1'. Global enable register 430 is set to output a logical '1'. Hence, the trigger logic has now been programmed and its operation will be described.

In the absence of a match signal on any of lines 215, 245 or 275, multiplexers 600, 610 and 620 each output a logical '0' to OR gate 650 which also outputs a logical '0' to AND gate 670 which, in turn, outputs a logical '0' to multiplexer 690. Hence, multiplexer 690 outputs a logical '0' to AND gate 700 which also outputs a logical '0' and the serialise mechanism remains inactivated. The output of AND gate 710 is also a logical '0' and cannot change whilst the trap enable register remains set at a logical '0', hence the ability to activate the trap mechanism is disabled.

When a match signal is received on any of lines 215, 245 or 275 (i.e. because the instruction type for instruction A has been detected at any of the corresponding pipelined stages), multiplexers 600, 610 or 620 output a logical '1' to OR gate 650. When OR gate 650 receives a logical '1' on any of its inputs it outputs a logical '1'. AND gate 670 now also receives a logical '1' on all its inputs and also outputs a logical '1'. Multiplexer 690, therefore, outputs a logical '1'. Hence, AND gate 700 receives a logical '1' on all its inputs and outputs a logical '1' to activate the serialise mechanism. The output of the AND gate 710 remains a logical '0'.

The operation of the control logic 300 and the trigger logic 290 will be further described with reference to Example 2.

As mentioned above, the trigger logic 290 is firstly programmed by the control logic 300. Accordingly, select register 400 in this instance is arranged to force multiplexer 600 to output the input received over line 215, to force multiplexer 610 to output the input received over line 245, to force multiplexer 620 to output the input received over line 275, to force multiplexers 630, 631 and 690 to output the logical '1' input and to force multiplexer 680 to output the input received from AND gate 660. Trap enable register 410 is set to output a logical '1', whilst serialise enable register 420 is set to output a logical '0'. Global enable register 430 is set to output a logical '1'. Hence, the trigger logic has now been programmed and its operation will be described.

In the absence of a match signal on all of lines 215, 245 and 275, AND gate 640 receives a logical '0' on at least one of its inputs and, hence, a logical '0' is output to AND gate 660 which, in turn, outputs a logical '0' to multiplexer 680. Hence, multiplexer 680 outputs a logical '0' to AND gate 710 which also outputs a logical '0' and the trap mechanism remains inactivated. The output of AND gate 700 is also a logical '0' and cannot change whilst the serialise enable register remains set at a logical '0', hence the ability to activate the serialise mechanism is disabled.

When a match signal is received on all of lines 215, 245 and 275, multiplexers 600, 610 and 620 each output a logical '1' to AND gate 640. AND gate 640 now receives a logical '1' on all its inputs and, hence outputs a logical '1'. AND gate 660 also receives a logical '1' on all its inputs and also outputs a logical '1'. Multiplexer 680, therefore, outputs a logical '1'. Hence, AND gate 710 receives a logical '1' on all its inputs and outputs a logical '1' to activate the trap mechanism. The output of the AND gate 700 remains a logical '0'.

Although these examples do not use micro-architectural state information, it will be apparent to those skilled in the art that the multiplexer 630 or 631 needs simply to be forced to select as its output the signal received over line 310 or 320 respectively in order to require the correct micro-architectural state information to be present in combination with the problematic instruction to activate the appropriate mechanism.

Typically, if M1, M2, M3 correspond to match signals 215, 245, 275 and C1, C2, C3 are micro-architectural state information signals received over lines 310, 320 (and another line not shown), then it will be appreciated that the trigger logic 290 would allow the selection of:

M1
M2
M1 AND M2
M1 OR M2
M1 AND M2 AND M3
M1 OR M2 OR M3
M1 AND C1
M2 AND C1
M1 AND M2 AND C1
(M1 OR M2) AND C1
M1 AND M2 AND M3 AND C1
(M1 OR M2 OR M3) AND C1
M1 AND C2
M2 AND C2
M1 AND M2 AND C2
(M1 OR M2 AND C2
M1 AND M2 AND M3 AND C2
(M1 OR M2 OR M3) AND C2
M1 AND C1 AND C2
M2 AND C1 AND C2
M1 AND M2 AND C1 AND C2
(M1 OR M2) AND C1 AND C2
M1 AND M2 AND M3 AND C1 AND C2
(M1 OR M2 OR M3) AND C1 AND C2
ETC ETC ETC . . . .

Also, whilst trigger logic 290 has been illustrated for handling a single condition for up to three match signals to produce one of two output signals, it will be appreciated that the logic can readily be expanded to handle more than three match signals, more than one condition and more than two output signals, as indicated by the dotted arrows in FIG. 5.

Furthermore, it will be appreciated that whilst the logic arrangements described above utilise a logical '0' to indicate the absence of a condition and a logical '1' to indicate the occurrence of a condition, this need not be so. A logical '1' could be used to indicate the absence of a condition and a logical '0' could be used to indicate the occurrence of a condition with appropriate changes being made to the logic.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
   a processor operable to execute instructions, each instruction having micro-architectural state information associated therewith;
   a comparator logic operable to compare said micro-architectural state information with predetermined micro-architectural state information associated with a problematic event and to issue a match signal if a match is detected; and
   a trigger logic, responsive to said match signal, for providing an output signal for activating a corresponding mechanism to alleviate the effects of said problematic event, wherein said processor has a plurality of pipelined stages, said problematic event is an instance of a problematic instruction and said trigger logic is programmed to issue a first output signal responsive to said match signal to activate a mechanism to serialise said problematic instruction.

2. The data processing apparatus of claim 1, wherein said comparator logic comprises a plurality of comparators, each comparator having predetermined micro-architectural state information associated therewith, said trigger logic being arranged to receive said match signals from each comparator and being programmable to output one of said plurality of output signals in dependence on said match signals.

3. The data processing apparatus of claim 2, wherein said problematic event is an instance of a problematic instruction.

4. The data processing apparatus of claim 3, wherein said processor has a plurality of pipelined stages, each comparator being provided at one of said pipelined stages to enable a sequence of problematic instructions to be detected.

5. The data processing apparatus of claim 3, wherein said processor has a plurality of pipelined stages, said plurality of comparators being provided at one of said pipelined stages to enable a plurality of problematic instructions to be detected at said one of said pipelined stages.

6. The data processing apparatus of claim 3, wherein said data processing apparatus has other micro-architectural state information associated therewith and said plurality of comparators includes at least one comparator having predetermined other micro-architectural state information associated therewith to enable a plurality of problematic instructions to be detected in combination with the predetermined other micro-architectural state information.

7. The data processing apparatus of claim 1, wherein said problematic event is an instance of a problematic instruction and said trigger logic is programmed to issue a second output signal responsive to said match signal to activate a mechanism to trap said problematic instruction.

8. The data processing apparatus of claim 1, wherein said micro-architectural state information is an instruction type indication.

9. The data processing apparatus of claim 8, wherein said comparator logic includes mask logic operable to identify a logical range of predetermined instruction types.

10. A data processing apparatus comprising:
    a processor operable to execute instructions, each instruction having an instruction type indication associated therewith;
    a comparator logic operable to compare said instruction type indication with a predetermined instruction type associated with a problematic instruction and to issue a match signal if a match is detected; and
    a trigger logic, responsive to said match signal, for providing an output signal for activating a corresponding mechanism to alleviate the effects of said problematic instruction, wherein said processor has a plurality of pipelined stages, said problematic event is an instance of a problematic instruction and said trigger logic is programmed to issue a first output signal responsive to said match signal to activate a mechanism to serialise said problematic instruction.

11. A problematic event detector for a data processing apparatus having a processor operable to execute instructions, each instruction having micro-architectural state information associated therewith, said problematic event detector comprising:
    a comparator logic operable to compare said micro-architectural state information with predetermined micro-architectural state information associated with a problematic event and to issue a match signal if a match is detected; and
    a trigger logic, responsive to said match signal, for providing an output signal for activating a corresponding mechanism to alleviate the effects of said problematic event, wherein said processor has a plurality of pipelined stages, said problematic event is an instance of a problematic instruction and said trigger logic is programmed to issue a first output signal responsive to said match signal to activate a mechanism to serialise said problematic instruction.

12. A method of handling problematic events in a data processing apparatus having a processor operable to execute instructions, each instruction having micro-architectural state information associated therewith, the method comprising the steps of:
    a) comparing said micro-architectural state information with predetermined micro-architectural state information associated with a problematic event;
    b) issuing a match signal if a match is detected during said comparing step; and
    c) responsive to said match signal, causing a trigger logic to provide an output signal for activating a corresponding mechanism to alleviate the effects of said problematic event, and said trigger logic being programmable to determine which of said output signals is provided upon receipt of said match signal, wherein said processor has a plurality of pipelined stages, said problematic event is an instance of a problematic instruction and said step c) comprises issuing a first output signal responsive to said match signal to activate a mechanism to serialise said problematic instruction.

13. The method of claim 12, wherein steps a) to c) comprise:
   a) comparing said micro-architectural state information with a plurality of predetermined micro-architectural state information, each being associated with a problematic event;
   b) issuing match signals if a match is detected during said comparing step; and
   c) responsive to said match signals, causing said trigger logic to provide an output signal for activating a corresponding mechanism to alleviate the effects of said problematic event, and said trigger logic programmed for determining which of a plurality of output signals is provided upon receipt of said match signals.

14. The method of claim 13, wherein said problematic event is an instance of a problematic instruction.

15. The method of claim 14, wherein said processor has a plurality of pipelined stages and step a) comprises:
   comparing at each pipelined stage said micro-architectural state information with predetermined micro-architectural state information to enable a sequence of problematic instructions to be detected.

16. The method of claim 14, wherein said processor has a plurality of pipelined stages and step a) comprises:
   comparing at one pipelined stage said micro-architectural state information with a plurality of micro-architectural state information to enable a plurality of problematic instructions to be detected at said one pipelined stage.

17. The method of claim 14, wherein said data processing apparatus has other micro-architectural state information associated therewith and said step a) comprises:
   comparing said other micro-architectural state information with predetermined other micro-architectural state information to enable a plurality of problematic instructions to be detected in combination with the predetermined other micro-architectural state information.

18. The method of claim 12, wherein said problematic event is an instance of a problematic instruction and said step c) comprises:
   issuing a second output signal responsive to said match signal to activate a mechanism to trap said problematic instruction.

19. The method of claim 12, wherein said problematic event is an instance of a problematic instruction and said step a) comprises:
   comparing said micro-architectural state information with a logical range of predetermined micro-architectural state information, each being associated with a problematic instruction.

20. The method of claim 12, wherein said micro-architectural state information comprises an instruction type indication.

* * * * *